US011551160B2

(12) United States Patent
Handler et al.

(10) Patent No.: US 11,551,160 B2
(45) Date of Patent: Jan. 10, 2023

(54) COMPOSITE ASSET OPTION POOL

(71) Applicant: Inspirato LLC, Denver, CO (US)

(72) Inventors: Brad Handler, Denver, CO (US);
Cody Holloway, Denver, CO (US);
Brent Handler, Englewood, CO (US)

(73) Assignee: Inspirato LLC, Denver, CO (US)

( * ) Notice: Subject to any disclaimer, the term of this patent is extended or adjusted under 35 U.S.C. 154(b) by 38 days.

(21) Appl. No.: 16/778,716

(22) Filed: Jan. 31, 2020

(65) Prior Publication Data

US 2021/0241186 A1 Aug. 5, 2021

(51) Int. Cl.
*G06Q 10/02* (2012.01)
*G06F 3/04842* (2022.01)
*G06Q 30/02* (2012.01)
*G06Q 30/06* (2012.01)
*G06Q 50/14* (2012.01)

(52) U.S. Cl.
CPC ......... *G06Q 10/02* (2013.01); *G06F 3/04842* (2013.01); *G06Q 30/0284* (2013.01); *G06Q 30/0645* (2013.01); *G06Q 50/14* (2013.01)

(58) Field of Classification Search
CPC ............. G06Q 10/109; G06Q 10/1091; G06Q 10/1093; G06Q 10/1095; G06Q 10/1097; G06Q 10/083
See application file for complete search history.

(56) References Cited

U.S. PATENT DOCUMENTS 10,127,591 B1 * 11/2018 Wollmer ............ G06Q 30/0603
2006/0212322 A1 * 9/2006 Gunn .................. G06Q 10/025
705/6

(Continued)

FOREIGN PATENT DOCUMENTS

WO WO-2021154347 A1 8/2021

OTHER PUBLICATIONS https://archive.ph/H3Bvq, (Dec. 22, 2018), p. 3 of attached PDF (Year: 2018).*

(Continued)

*Primary Examiner* — Daniel Vetter
*Assistant Examiner* — Christopher Gomez
(74) *Attorney, Agent, or Firm* — Schwegman Lundberg & Woessner, P.A.

(57) ABSTRACT

Systems and methods are disclosed for providing a reservation based subscription service that includes one or more processors that perform operations comprising: receiving reservation information for a subscriber of a reservation-based subscription service, the reservation information comprising a booking date and a reservation date; computing a subscription value for the subscriber based on the reservation information; generating, based on the subscription value, a candidate composite offering that includes a first candidate reservation service of a first type and a second candidate reservation service of a second type that are available on the reservation date; determining that the second candidate reservation service has expired; and in response to determining that the second candidate reservation service has expired, modifying the candidate composite offering with a complementary reservation service corresponding to the second candidate reservation service.

20 Claims, 8 Drawing Sheets

(56) References Cited

U.S. PATENT DOCUMENTS

| | | | |
|---|---|---|---|
| 2007/0276707 A1* | 11/2007 | Collopy | G07B 15/00 705/5 |
| 2008/0201178 A1* | 8/2008 | Vizitei | G06Q 10/02 705/5 |
| 2009/0030743 A1 | 1/2009 | Fussy | |
| 2011/0087985 A1* | 4/2011 | Buchanan | G06Q 40/04 715/771 |
| 2013/0041696 A1* | 2/2013 | Richard | G06Q 50/14 705/5 |
| 2014/0095524 A1* | 4/2014 | Fleischman | G06Q 10/02 707/759 |
| 2015/0154512 A1* | 6/2015 | Wenger | G06Q 50/14 705/5 |
| 2015/0161528 A1 | 6/2015 | Yalcin et al. | |
| 2016/0203422 A1 | 7/2016 | Demarchi et al. | |
| 2017/0358022 A1* | 12/2017 | Deak | G06Q 30/0631 |
| 2018/0060989 A1* | 3/2018 | Hietanen | G06K 7/10722 |
| 2020/0118226 A1* | 4/2020 | Agarwal | G06Q 20/3278 |
| 2020/0327628 A1* | 10/2020 | Mitra | G06F 16/9535 |
| 2020/0342365 A1* | 10/2020 | Leardi | G06Q 50/14 |
| 2021/0133847 A1* | 5/2021 | Mezaael | G06Q 10/0836 |

OTHER PUBLICATIONS

"How Marriott Timeshare Works", Dec. 10, 2019, (https://web.archive.org/web/20191210211101/https://www.marriottvacationclub.com/timeshare-ownership/how-it-works/) (Year: 2019).*

AMC Theaters, Join AMC Stubs, https://archive.ph/H3Bvq, (Dec. 22, 2018), p. 3 of attached PDF (Year: 2018).*

"International Application Serial No. PCT US2020 055230, International Search Report dated Dec. 21, 2020", 4 pgs.

"International Application Serial No. PCT US2020 055230, Written Opinion dated Dec. 21, 2020", 8 pgs.

"International Application Serial No. PCT US2020 055230, International Preliminary Report on Patentability dated Aug. 11, 2022", 10 pgs.

* cited by examiner

COMPOSITE ASSET OPTION POOL

BACKGROUND

Web-based travel services systems allow a user to search through various travel services available by multiple providers. A user can specify a destination and travel time frame to find matching hotels, rental cars, and airfares along with their corresponding costs. The user can sort the results by price, type and availability of the travel service. After the user finds a suitable hotel, rental car, or airfare, the user can utilize the web-based travel services to reserve the hotel, rental car, or airfare.

BRIEF DESCRIPTION OF T DRAWINGS

Various ones of the appended drawings merely illustrate example embodiments of the present disclosure and should not be considered as limiting scope.

DETAILED DESCRIPTION

Figure 1:
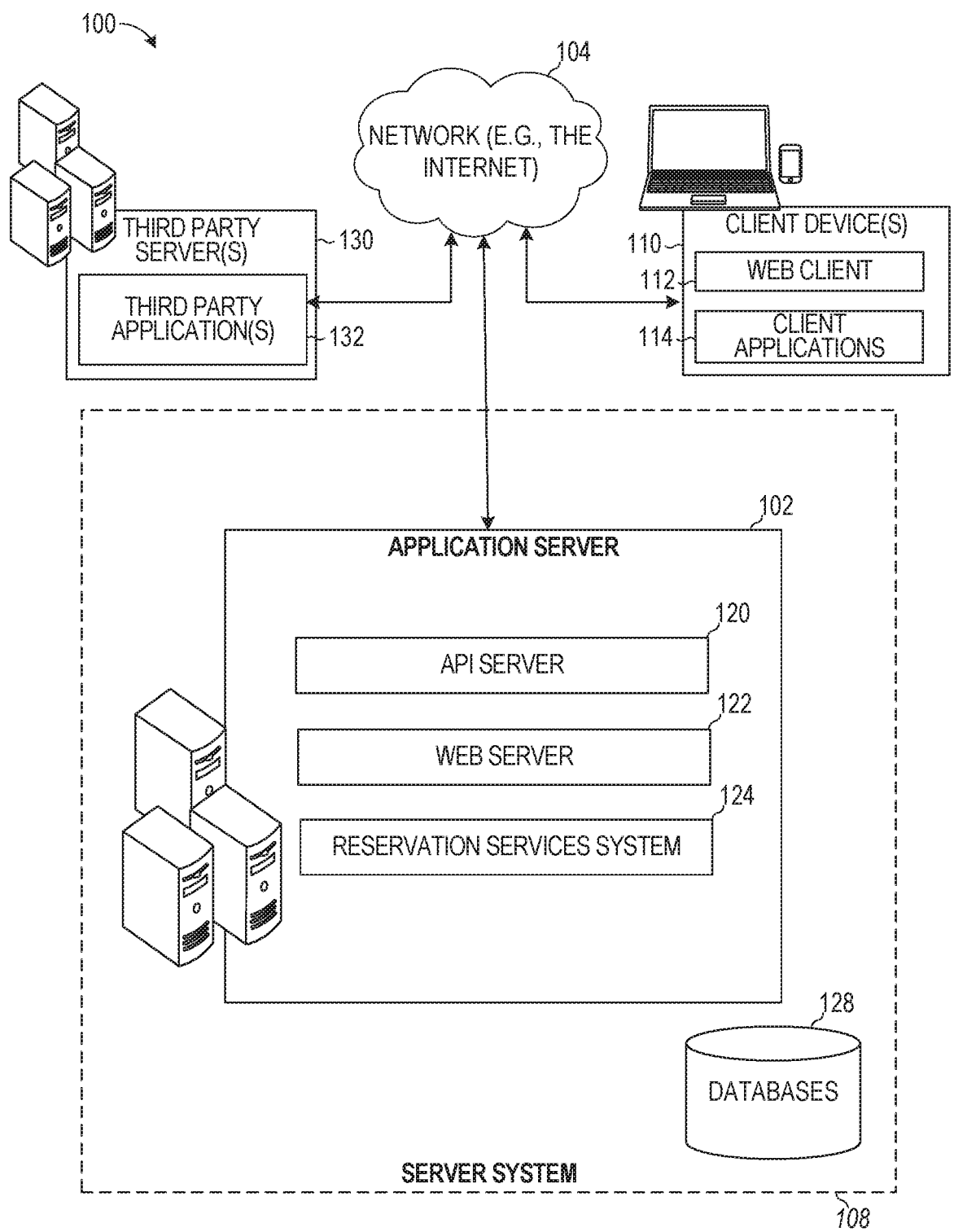
FIG. 1 is a block diagram illustrating a networked system for a subscription-based reservation service, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users typically spend a great deal of time and effort making travel arrangements, such as looking for hotels, airfares, and car rentals that are within their budget. Existing travel sites allow a user to input various travel criteria, such as travel dates and destinations, to search for all the available hotels, airfares, and car rentals that match the travel criteria. The existing travel sites also allow the user to sort and filter results based on a specified cost. While such existing travel sites generally work well for making travel arrangements, there is often a large disparity between cost and availability for the same or similar hotels, airfares, and car rentals across different travel sites. This ends up burdening the user as the user has to search through the available options across multiple travel sites to make sure he or she gets the best price within their budget. Searching through multiple travel sites takes a great deal of time and effort and forces the user to navigate through multiple pages of information and manually compare results to make travel arrangements. Even still, the travel arrangements the user finally settles on may not provide the user with the best available options for their budget.

In addition, once a user finally finds a desired travel service, making reservations with the travel service requires the user to complete a checkout process by navigating through many checkout screens. For example, the user has to first select the desired travel service, then input various personal information on another screen, then navigate to a payment screen to provide payment information, and finally, the user can confirm reservation for the desired travel services in a confirmation screen. This further adds to the inefficient use of system resources for making travel service reservations using traditional systems and further wastes a user's time and effort.

Certain travel sites blindly aggregate or search through all of the available travel options across numerous websites of hotels, airlines and car rental companies to generate as many different combinations as possible of travel options. This type of aggregation consumes a great deal of system processing and storage resources and substantially burdens networks and consumes bandwidth that can otherwise be used for other tasks. To address some of these issues, certain organizations install additional dedicated servers or services, which ends up being costly and inefficient. Rather than aggregating blindly all of the available travel options, some travel sites perform a search across millions of different travel service options based on user supplied criteria. Such searches take a great deal of time and also consume a tremendous amount of system processing and storage resources. Because of the amount of time these searches take to complete, users end up either leaving the system altogether or being frustrated at the end result and may end up not making any travel reservations at all.

Some subscription-based travel services address the above issues and expedite presentation of travel service options by pre-aggregating various combinations of travel services in an intelligent way based on a given set of factors. However, such travel services systems present users with travel service options for travel of a single type. Specifically, these travel services systems present users with various hotel stays of different lengths and locations based on the user's subscriptions but do not consider other types of travel types that may interest the user. Also, oftentimes there remains a great disparity between the amount the user pays for the subscription to these travel services and the travel service options provided to the user. Namely, the user may pay a certain amount for their subscription which far exceeds the overall value and cost of the travel service options presented to the user. Such circumstances lead to users leaving or not renewing their subscriptions and resorting to the traditional less efficient way of making travel arrangements.

The disclosed embodiments improve the efficiency of using an electronic device by providing an improved way to offer more travel flexibility to users of a subscription-based reservation services system, providing a better way for users to conduct travel. The subscription-based reservation service, according to the disclosed embodiments, allows a user to search for reservation services and make reservations for such reservation services (e.g., hotels, rental cars, airfares, homes/residences, experiential travel, guided tours, cruises, train fares, private aviation, "clamping," bespoke travel, event-based travel, and/or space travel) for a fixed annual or monthly subscription fee. The disclosed subscription-based reservation service pre-aggregates various combinations of reservation service options of different types (e.g., car rentals combined with flights or hotels combined with dinner reservations) based on a given set of factors including a subscription value computed for individual users. Specifically, the disclosed subscription-based reservation service maximizes the use of the user's subscription value in generating various combinations of reservation service options. In this way, if the cost or value of a specific hotel in a given region falls short of meeting the user's subscription value (e.g., the amount the user paid or will end up paying for the subscription when the reservation is consumed), the subscription-based reservation service can select one or more add-on reservations to complete the difference in value. Namely, the subscription-based reservation service can determine the difference in value between the cost or value of the hotel and the subscription value and find a reservation service of another complementary type to add on to the specific hotel (e.g., a dinner reservation). The add-on reservation may have a value that corresponds to the difference n value between the cost or value of the hotel and the subscription value. The subscription-based reservation service creates a composite reservation option or offering by combining the specific hotel and the dinner reservation to allow the user to reserve both reservations of the composite option or offering quickly and efficiently (e.g., by simply selecting a reserve option without navigating to further payment and checkout screens).

The user who is a subscriber to the subscription-based reservation service is authorized to make an unlimited number of reservations for reservation services (including composite reservation options or offerings) without having to consider budgetary constraints or navigating through checkout screens and can search through the reservation services very quickly with minimal delay. While certain embodiments are described with reference to travel services, similar functionality can be applied to sporting event tickets, event tickets, concert tickets, entertainment tickets and restaurant reservations. In such cases, a subscription service can be provided that allows a user to pay a monthly or annual subscription fee and make an unlimited number of reservations for sporting event tickets, event tickets, entertainment tickets, concert tickets, and restaurant reservations without having to consider budgetary constraints.

In some embodiments, the reservation service automatically identifies, curates, and generates a predetermined list of all of the best available reservation service options including combining reservation services of different types for a specified travel period and destinations from which the user can select based on the user's subscription value. Each reservation service option may correspond to a given reservation service that is associated with a fixed or predetermined travel duration, such as three- or five-day stays at a hotel. Reserving a desired reservation service can be performed without navigating through multiple checkout and payment screens as the payment and user information needed to reserve the reservation service is performed using the subscription information and subscription payments the subscriber makes. Specifically, the disclosed embodiments store ahead of time various personal information about a user in a user profile and receive subscription payments from the subscribers. In this way, the disclosed embodiments can very quickly automatically reserve and pay for a user-selected reservation service (including composite reservation services) using the previously stored personal information and the previously provided subscription payments avoiding the need to navigate the user through a checkout process.

In this way, the amount of time and effort the user has to spend searching for travel services that meet the user's budget and reserving such reservation services are significantly reduced. In addition, because the reservation service options are pre-aggregated based on various factors, system resources are used more efficiently than with traditional travel service systems. Also, by providing a single interface and travel site for making reservation arrangements that automatically take into account various reservation service costs in providing reservation service options to the user and that store personal user information ahead of time and receive subscription payments, the number of steps, pages, and interfaces the user has to navigate through to make reservation arrangements is reduced. This provides a better way for a user to consume reservations. Namely, the user does not need to search through multiple travel sites and pages of information to find reservation arrangements that satisfy the user's needs.

FIG. 1 is a block diagram illustrating a networked system 100 for a subscription-based travel service, according to some example embodiments. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module to display information (e.g., in the form of graphical user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize subscription-based travel services via a reservation services system 124 implemented by an application server 102.

For example, the client device 110 may be used by a user to navigate to a website of the reservation services system 124. In some embodiments, the client device 110 may include a dedicated reservation services system 124 application with the same or similar functionality as the website. After accessing the website or the application on the client device 110, the user inputs personal information (e.g., name, address, phone number, payment information, geographical location, home address, and so forth) to access the reservation services system 124.

In some embodiments, access to the reservation services system 124 requires a subscription fee to be paid. The subscription fee is paid monthly but can be paid on any other periodic or non-periodic interval (e.g., weekly-, daily, every other month, annually, lifetime, and so forth). After subscribing to the reservation services system 124 by paying a periodic subscription fee, the user is provided with login credentials that can be used to navigate and browse available reservation services on the reservation services system 124 and reserve or book reservation services. For example, the user can access the reservation services system 124 to browse hotel rooms available in various luxury categories in a selected geographical location on a particular date or range of dates. The reservation services system 124 also allows the user to browse composite reservation offerings (e.g., reservations that include different types of reservation services, such as a composite offering of a hotel and dinner reservation). In some cases, the type of subscription the user has may determine which types of reservation services can be combined to create a composite offering. For example, the user can select a theater or dinner add-on reservation service. In such cases, the reservation services system 124 searches for various combinations of a primary reservation service associated with the user's subscription (e.g., a hotel stay) and the add-on reservation services (e.g., the theater or dinner reservation) to generate composite offerings that include the combinations of the different types of reservation services.

The reservation services (including composite reservation offerings) are pre-aggregated (e.g., the combinations of reservation services are created before user search criteria is received) and the user searches through the pre-aggregated reservation services. This reduces the amount of system resources required to find reservation services that meet user search criteria and expedite presentation of results. Also, the pre-aggregated reservation services are associated with costs that may be lower than the off-the-shelf cost of purchasing such reservation services ad hoc. Namely, because the user is limited to searching through pre-determined combinations of reservation services on the subscription-based reservation service, such reservation services can be provided at a lower cost than if the user were to search for the same reservation services and make their own combination using a non-subscription based traditional reservation site.

In some cases, the reservation services system 124 presents the user with various subscription options that include different combinations of composite reservation offerings. For example, the reservation services system 124 may present a first option to activate a subscription that allows the user to only select reservation services of a single type without composite reservation services. In response to receiving selection from the user of the first option, the reservation services system 124 charges the user the subscription fee and enables the user to reserve reservation services of a single type (e.g., the user is only presented with hotel stays, flights, or dinner reservations). The single type of reservation services have a value that correspond to the subscription value (e.g., the amount the user will end up paying for the subscription when the reservation service begins or is consumed).

As another example, the reservation services system 124 may present a second option to activate a subscription that allows the user to define which composite reservation services the user would like to reserve or select from predefined composite reservation services (e.g., hotels and dinner reservations; flights and rental cars; hotels and theater tickets; rental cars and experiences; cruises and experiences; hotels, dinner reservations and theater tickets, and so forth). For example, the user may specify that the user would like to have a primary reservation service type (e.g., hotel) and rank one or more secondary reservation service types to be combined with the primary reservation service type dinner reservations or theater tickets). In some cases, the user is presented with a predefined list of different composite reservation services that are available (each may have a different subscription cost) and the user can select which composite reservation services the user would like to subscribe to. In response to receiving selection from the user of the second option, the reservation services system 124 presents the user with options to reserve reservations of multiple types (e.g., composite reservation services). Namely, the reservation services system 124 charges the user a subscription fee and searches for various combinations of the defined types of reservation services that correspond to the subscription. The composite reservation services that are available for the user when the second option is selected have multiple types of reservation services in each offering that together have a combined value that corresponds to the subscription value (e.g., the amount the user will end up paying for the subscription when the reservation service begins or is consumed). When the user selects a composite reservation service offering that is presented, the reservation services system 124 automatically reserves all of the reservation service types that are included in the composite reservation service offering. The type of subscription the user selects may generate a rule that is used to create composite reservation service offerings to the user.

As another example, the reservation services system 124 may present a third option to activate a subscription that allows the user to select from composite reservation services and reservation services of a single type. In such cases, the reservation services system 124 presents a list of reservation services that include only one type of reservation service (e.g., hotels) and also include composite reservation service offerings (e.g., hotels and dinner reservations).

As another example, the reservation services system 124 may present a fourth option to activate a subscription that allows the user to select a specified region or specified maximum duration. In such cases, the reservation services system 124 presents a list of reservation services (of a single type or composite reservation services) that are limited to the specified region and/or have durations less than or equal to the maximum duration.

In some embodiments, the options for selecting the type of subscription service may be presented at the same time in the same graphical user interface. In some cases, a user can start a subscription responsive to selection of one option and may upgrade or downgrade (for a fee or a refund) to another subscription service type.

A value of a reservation service corresponds to a user's subscription value when the value of the reservation service is between a value guard. For example, if the extrinsic value (the perceived benefit to the user) of a reservation service is greater than the amount the user will end up paying for the subscription when the reservation service begins or is consumed, then the value of the reservation service corresponds to the subscription value. Specifically, if the cost for reserving the same reservation service on a third-party website is more than the amount the user will end up paying for the subscription when the reservation service begins or is consumed, then the value of the reservation service corresponds to the subscription value. As another example, if the intrinsic value (the cost incurred by, the reservation services system 124 for making the reservation) of a reservation service is less than the amount the user will end up paying for the subscription when the reservation service begins or is consumed, then the value of the reservation service corresponds to the subscription value. The term "composite reservation service" or "composite offering" refers to any reservation service that is made up of more than one type of reservation service. A composite offering allows a user to simultaneously reserve all the types of reservation services included in the composite offering by selecting a suitable option without navigating through a complex and time consuming checkout process.

In some embodiments, after the user activates their subscription, the client device 110 presents a graphical user interface with data entry regions allowing the user to select from a predefined list of reservation services (e.g., at various geographical locations) available on a reservation date input by the user. In some cases, the graphical user interface allows the user to manually type in a name of a desired geographical location destination and the desired reservation date (e.g., the date the user plans to take the trip and consume the reservation service and/or the length of time for the trip). As the user types in the name of the desired geographical location destination, the reservation services system 124 searches through the predetermined combinations of reservation services available on the reservation date that are at the desired geographical location(s) and presents the available reservation services to the user for selection. In some cases, the list of reservation services that are presented to the user are selected based on a likelihood that the user will consume (e.g., reserve or book) the reservation services. Depending on the user's subscription, the list of reservation services may include one or more composite offerings or composite reservation services.

In response to receiving a user selection of one or more of the reservation services, prior to or during selection of the destination, the client device 110 presents a data entry region for the user to input a specific reservation start date (e.g., an arrival date at the hotel) and a number of days for the trip. In some embodiments, the list of available reservation services is automatically searched for on a daily basis without receiving the user selection of the travel destination and/or travel start date. The reservation services system 124 retrieves subscription information for the user specifying the amount the user pays on a monthly, annual, or other periodic basis. Using the subscription information, the reservation services system 124 computes one or more subscription values as a function of the booking date and the travel date. The booking date may be computed based on the current date on which the user selection of the travel destination is received and/or the current date on which a list of reservation services is searched and curated.

The reservation services system 124 utilizes the subscription value and a value guard to search for reservation services that satisfy or correspond to the subscription value and the value guard. The value guard is used as a filter of reservation services to ensure that the reservation service options presented to the user have a cost and/or value that satisfies a minimum value amount and does not exceed a maximum purchase amount corresponding to the estimated or computed subscription value.

After activating the subscription to the reservation services system 124, the reservation services system 124 provides matching reservation services results to the client device 110 for presentation in the graphical user interface using one or more interactive visual representations. The graphical user interface of the client device 110 may be utilized to access reviews, comments, and additional information for each of the reservation services represented by the interactive visual representations.

The client device 110 receives a user input selecting one of the interactive visual representations for a reservation service and communicates the selection to the reservation services system 124. The reservation services system 124 automatically reserves the reservation service (e.g., holds and pays for a room at a hotel) corresponding to the selected interactive visual representation. The client device 110 may present a confirmation page to the user informing the user of the reservation service that has been reserved and the travel start date.

In some implementations, the reservation services system 124 may limit the number of concurrent reservation services the user can reserve. For example, the reservation services system 124 may allow the user to select only one reservation service reservation at a time, such that the user is prevented from searching for and/or reserving additional reservation services until the currently selected travel service that has been reserved expires or is canceled. As another example, the reservation services system 124 may only allow the user to reserve three reservation services at a time, such that when one of the three reservation services expires, the user can reserve an additional reservation service. Namely, after the start and end dates for the travel service elapse indicating that the user has utilized the reservation service, the client device 110 may allow the user to search for additional reservation services to reserve in a similar manner as before if the user's subscription is still active. Alternatively, the user can navigate to a cancelation page or graphical user interface using the client device 110 and cancel any reservations previously selected within a cancelation window (e.g., within 72 hours prior to the travel start date). In response to receiving a user request to cancel the travel service, the reservation services system 124 may cancel the reservation and the client device 110 may allow the user to search for and reserve a new reservation service in a similar manner as before.

In some embodiments, the reservation services system 124 provides an improved way to allow users to make reservations using a subscription-based reservation system. The reservation services system 124 performs such improved techniques in various phases or steps. Initially, the reservation services system 124 generates an inventory of reservation services by searching reservation services across a range of dates or specific dates throughout the year between the start and end dates of a user's subscription. The reservation services are searched from publicly available information sources (e.g., databases of other travel sites available to non-subscribers of the reservation services system 124), by direct access to a predetermined set of reservation services, third party sources, proprietary sources, and reservation services that have direct relationships and contracts for reservation services with the reservation services system 124. The reservation are searched periodically (e.g., nightly or weekly) using various combinations of travel dates and destinations. The reservation services system 124 also searches reservation services of multiple types. For example, the reservation services system 124 may search for reservation services of one type (e.g. hotels) from a first set of third-party sources and may search for reservation services of a second type (e.g., theater tickets) from a second set of third-party sources. Each search result may provide an extrinsic value of the reservation service (which may differ depending on the type of reservation service) and/or may provide the intrinsic value of the reservation service. The extrinsic and intrinsic values are stored in association with each reservation service to be used in generating or determining whether a given pair or set of types of reservation services can be combined to form a composite offering.

The search returns a predetermined list of reservation services available at various dates (including various composite offerings) throughout the world and includes the total cost for consuming the travel services on the particular combination of dates along with the cancelation policy of each travel service. The cancelation policy may indicate the fee for canceling the reservation service once booked which may be free or a nominal charge. As a result, the output of phase one or step one is a collection or database of tens of millions of combinations of reservation services, at different ranges of travel start dates, with corresponding prices or costs, and with corresponding cancelation policies.

In an embodiment, each reservation service is associated with a second cost that represents the cost incurred by the reservation services system 124 to reserve the travel service. This second cost can be pre-negotiated between each travel service and the reservation services system 124. The second cost may or may not be presented to users of the reservation services system 124. Each reservation service may also be associated with a first cost that represents the off-the-shelf cost for reserving the reservation service using traditional methods. Namely, the first cost represents the price non-subscribers of the reservation services system 124 pay for consuming the reservation service by, for example, directly purchasing the reservation service or reserving the reservation service with the provider of the reservation service (e.g., making the reservation for the hotel using the hotel website). In some implementations, the first cost is higher than the second cost. As a result, subscribers of the reservation services system 124 can benefit from lower cost reservation services as the reservation services system 124 can offer various reservation services at a cost greater than the second cost but lower than the first cost of each reservation service.

In the next step or phase, the collection of the travel services identified in the previous phase is curated or filtered in accordance with one or more rules. Specifically, any, all, or a combination of the information associated with each reservation service (e.g., the travel start dates, the prices, the travel service type, the destination, the transportation criteria, and the cancelation policy) is analyzed and compared with the one or more rules to exclude and select a list of candidate travel services. In an embodiment, the rules include various criteria (e.g., the booking date or date on which the reservation for a given reservation service is made or requested and/or the price with taxes and fees (cost of the reservation)), which are used to curate or filter the collection of travel services. The rules may vary between users of the reservation services system 124 as different users are in geographically disparate locations.

Specifically, the rules consider how much the reservation services system 124 is willing or allowed to spend (e.g., the maximum purchase amount) for a given reservation service, relative to the first or second cost of the given reservation service, which is leveraged against how far in advance the reservation is being made (e.g., the difference between the booking date and the reservation start date). The maximum purchase amount may be computed based on various factors including payments received (e.g., the amount a subscriber will actually end up paying from the booking date to the reservation start date and an amortized amount by week of the subscriber's subscription cost). Namely, a maximum purchase amount may be computed to be used as a basis for filtering the reservation services based on cost.

In some cases, the amount the subscriber will actually end up paying may be computed by determining how many subscription cycles or how many payments will be collected between the booking date and the reservation start date For example, a subscriber may have a subscription that is activated on the first of the month and may be determined to have an estimated monthly cost that is paid on a first day of every month. The booking date may be in the middle of a given month and the reservation start date is two months from the booking date. In such cases, the subscriber will pay two cycles of subscription fees—two monthly payments—by the time the trip starts. The amortized amount is less granular and represents, on a repeated time interval (e.g., daily, monthly, weekly, hourly) basis, how much the subscriber pays. The maximum purchase amount is then offset by a margin (weight) which may be positive or negative. The margin (weight) may vary based on how far in advance the reservation is being made (e.g., the difference between the booking date and the travel start date). The margin may vary based on the type of travel service being booked or reserved. For example, the margin may be greater for travel services that include or relate to cruises and smaller for travel services that include or relate to homes/residences.

The reservation services system 124 computes a minimum value (e.g., the extrinsic value) representing the maximum a given user would be willing to pay for the travel service. This may be computed as a percentage (e.g., 80%) of the amount the subscriber will pay by the time the trip begins. Specifically, the amount is a percentage of the number of subscription cycle payments the subscriber will make by the reservation start date, starting from the booking date. This amount is used to remove any reservation services that have a first cost (e.g., cost available to non-subscribers of the reservation services system 124) that is less than the minimum value as the subscriber can shop those travel services independently of being a subscriber to the reservation services system 124. The reservation services system 124 eliminates any duplicates from the travel services and maintains those travel services that have a maximum duration of reservation dates.

The reservation services system 124 searches the actual price or second cost of the various travel services and applies a margin to the second cost of each travel service. The margin may be positive or negative and may depend on how far in advance the travel date is relative to the booking date. The reservation services system 124 filters any travel service that has a second cost (e.g., cost incurred to make the reservation by the reservation services system 124) that exceeds the maximum purchase amount and filters any travel service that has a first cost (e.g., cost available to non-subscribers of the reservation services system 124) that is below the minimum travel value. The reservation services system 124 applies an additional filter based on cancelation policies of travel services that do not satisfy a given cancelation policy criteria.

In some cases, rather than removing a given reservation service that has a first cost that is less than the minimum value, the reservation services system 124 searches for an add-on reservation service of another type (e.g., a complementary type or type guided by a rule) to combine with the given reservation service to increase the first cost of the given reservation service and form a composite offering. Namely, the reservation services system 124 may identify a second reservation service of a second type that has a cost available to non-subscribers that is also less than the minimum value. The reservation services system 124 may add the cost of the second reservation service of the second type with the first cost of the given reservation service of the first type. The reservation services system 124 may compare the combined costs of the given reservation service and the second reservation service and determine that the combined cost is greater than the minimum value. The reservation services system 124 may then retrieve the second cost of the given reservation service (e.g., the intrinsic value) and combine the second cost of the given reservation service with the intrinsic value (e.g., the second cost of the second reservation service). The reservation services system 124 may determine whether the combined second costs (e.g., the total intrinsic value of the two reservation services) is less than the maximum purchase amount. If so, the reservation services system 124 may combine the given reservation service with the second reservation service to form a composite reservation service or composite offering.

Specifically, rather than removing a given reservation service of a given type from a list that is presented to the user, the reservation services system 124 may search for add-on reservation services of different types that can be combined with the given reservation service to form a composite offering that has cost parameters that are within the value guard. Namely, the reservation services system 124 may form composite offerings that have combined extrinsic values of each reservation service included in the composite offering (e.g., the total costs if each reservation service were booked separately through one or more third-party sites) that is greater than the minimum value of the value guard and that also have combined intrinsic values (e.g., the total cost for the reservation services system 124 to reserve the reservation services included in the composite offering) that are less than the maximum purchase amount. The types of reservation services that are searched for to combine with a given reservation service may be based on a set of rules and/or a subscription type of the user. For example, certain primary reservation service types may not be allowed to be combined with certain other add-on reservation service types (e.g., car rentals may not be allowed to be combined with car sharing credits). In such cases, the efficiency of the electronic device is improved by having the reservation services system 124 exclude analyzing parameters of certain add-on reservation service types that conflict or are not allowed to be combined with certain other primary reservation service types. Namely, the reservation services system 124 may exclude analyzing or trying to combine car rentals when a user's subscription specifies that the primary reservation service type is car sharing credits.

In some embodiments, the reservation services system 124 presents the filtered list of travel services as options for the user or subscriber to select to make a reservation. The user can further filter the list based on various criteria (e.g., travel dates, travel destinations, etc.). In some embodiments, the reservation services system 124 presents to a user a comparison of each travel service that is presented against what is available for the same travel service on a publicly available or other travel site. Specifically, the reservation services system 124 presents, next to each travel service or next to a portion of travel services, an identification of another booking travel site that has the same travel service and the first cost for booking that same travel service on the other booking travel site. This first cost that is presented for comparison may be retrieved from storage based on what is in the collection that is analyzed and filtered to generate the list and/or may be determined automatically by accessing the other travel site, executing a search for the particular travel service and the particular range of travel dates, and retrieving the cost presented on the other travel site based on the executed search.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via a network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a web browser) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, and the like.

In some embodiments, one or more client applications 114 are included in a given one of the client device 110 and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and a reservation services system 124, that may be communicatively coupled with one or more databases 128. The one or more databases 128 may be storage devices that store data related to users of the system 108, applications associated with the system 108, cloud services, travel services data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store subscription information for one or more users of the reservation services system 124. The subscription information may identify users of the reservation services system 124, the subscription start dates of the users, the subscription end dates, the subscription fee of the users, the geographical locations of the users, the total amount paid-to-date for a subscription of the users, and/or one or more reservation services activities of the users. The reservation services activities may include any combination of the number of reservations made in a given time period (e.g., within a given subscription year) by each user, the subscription duration (e.g., measured from the subscription start date to the present date) of each user, the booking duration (e.g., measured from the booking date to the travel date) of each user, the distance to the travel destination of each user (e.g., measured from an address of the user and the location of reserved travel destinations), the margin amount (e.g., how much profit was made in aggregate during the course of the subscription) for each user, the cancelation frequency (e.g., how often the user cancels a reservation made), and/or the reservation frequency (e.g., how much time elapses on average between the end of one reservation and the start of another).

The one or more databases 128 may store the reservations e.g., the destination and the travel start date and/or duration) of reservation services of each user or subscriber of the reservation services system 124. The one or more databases 128 may store a list of all the available, or a selected set, of reservation services in one or more geographical regions or destinations along with reviews and/or detailed information about the travel services. The one or more databases 128 may store the first and second costs on a nightly basis or on some other periodic interval (e.g., per 6 night basis) for each travel service.

As referred to herein, the first cost that is stored in the one or more databases 128 may represent the cost for the reservation service that is provided to non-subscribers of the reservation services system 124 (also referred to as the extrinsic value) and is available by directly making the reservation through a dedicated server of the travel service and/or by making the reservation through an existing travel service search interface. The one or more databases 128 may access a dedicated existing reservation service search interface on a periodic basis (e.g., nightly or weekly) to obtain and download the first cost of each, or a selected set, of reservation services. As an example, the first cost may be computed by selecting a specified travel duration (e.g., 6 nights) and multiplying the per night rate (provided by the travel service) by the specified travel duration.

As referred to herein, the second cost of each reservation service may be a dedicated, pre; negotiated cost that is changed on an annual or monthly basis and is provided by contract between the reservation services system 124 and the corresponding reservation service (e.g., the hotel or theater). Reserving a reservation service at the second cost may only be available to users who subscribe to the reservation services system 124. The second cost of each reservation service may represent the cost for consuming the reservation service during a specified travel duration (e.g., 6 nights). The second cost may remain hidden from view from the subscribers of the reservation services system 124 as this cost is incurred internally. Namely, the subscriber need not be concerned with how much the reservation service costs to book as the subscriber can reserve any reservation service that is presented by the reservation services system 124 as being available.

In some embodiments, the reservation services system 124 generates first costs and second costs for multiple types of reservation services. For example, the reservation services system 124 may store in the databases 128 a list of hotels and their corresponding first costs (determined by accessing one or more third-party websites) and their corresponding second costs. As another example, the reservation services system 124 may store in the databases 128 a list of experiences and their corresponding first costs (determined by accessing one or more third-party websites) and their corresponding second costs. As another example, the reservation services system 124 may store in the databases 128 a list of flights and their corresponding first costs (determined by accessing one or more third-party websites) and their corresponding second costs. As another example, the reservation services system 124 may store in the databases 128 a list of theater tickets or cruises and their corresponding first costs (determined by accessing one or more third-party websites) and their corresponding second costs. The reservation services system 124 may use the first and second costs associated with each type of reservation service to generate one or more composite assets or offers.

The one or more databases 128 may store the cancelation policy of each reservation service indicating how much time in advance of the reservation start date at a given reservation service the reservation service reservation can be canceled without penalty (e.g., to receive a full refund). The one or more databases 128 may store the cost for canceling a given reservation service outside of the cancelation policy. The one or more databases 128 may store an expected margin on a per user basis. The expected margin may increase over time (e.g., for subscribers classified as very active) or decrease over time (e.g., for subscribers classified as not very active). The expected margin may increase or decrease based on the subscription type of a given user. The expected margin may change by a predetermined factor based on a difference between a booking date and a reservation start date (e.g., the margin may change based on how far in advance a user is making the reservation). This may be used to reduce the maximum purchase amount by a first factor if the reservation is made less than a predetermined number of days in advance of the reservation date. This may be used to increase the maximum purchase amount by a second factor if the reservation is made more than a predetermined number of days in advance of the travel date.

The server system 108 may be a cloud computing environment, according to some example embodiments. The server system 108, and any servers associated with the server system 108, may be associated with a cloud-based application, in one example embodiment.

The server system 108 includes a reservation services system 124. The reservation services system 124 includes one or more nodules, storage devices, and databases. The storage devices in the reservation services system 124 store various reservation services activities for each user, reservation services activities training data, and one or more machine learning techniques for classifying users of the reservation services system 124. The modules in reservation services system 124 are configured to compute components of a subscription value, compute value guards, and search for available reservation services to provide to the client device 110 in response to receiving a request for reservation services at a given destination and time frame. The modules in reservation services system 124 are configured to receive a user selection of one of the reservation services matching the request and reserve the selected reservation service for the user. The modules in reservation services system 124 are configured to determine whether the number of pending reservations for a given user exceeds an allowable number of pending reservations (e.g., more than one, or more than three) and, in response, prevent the user from making further reservations until the number of pending reservations is below the allowable number (e.g., by canceling a pending reservation or waiting for the reservation to expire).

The modules in reservation services system 124 are configured to train a machine learning technique to classify a given user or subscriber using the reservation services activities of the user or subscriber by establishing relationships between known reservation services activities and known or manually assigned classifications to users or subscribers. The modules in reservation services system 124 are configured to filter the available reservation services provided to a given client device 110 based on the classification of the user of the client device 110, subscription types, and/or cancelation policies of the various reservation services. The details of the reservation services system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more of the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include an existing non-subscription-based travel service. Such non-subscription-based travel services can be used to search for and determine the first cost of various types of reservation services. The reservation services system 124 may query the third-party servers 130 on a periodic basis to obtain the first costs for the reservation services provided by the reservation services system 124. As an example, the first costs may represent a per-night rate of the travel services multiplied by a predetermined number of nights (e.g., 6 nights).

Figure 2:
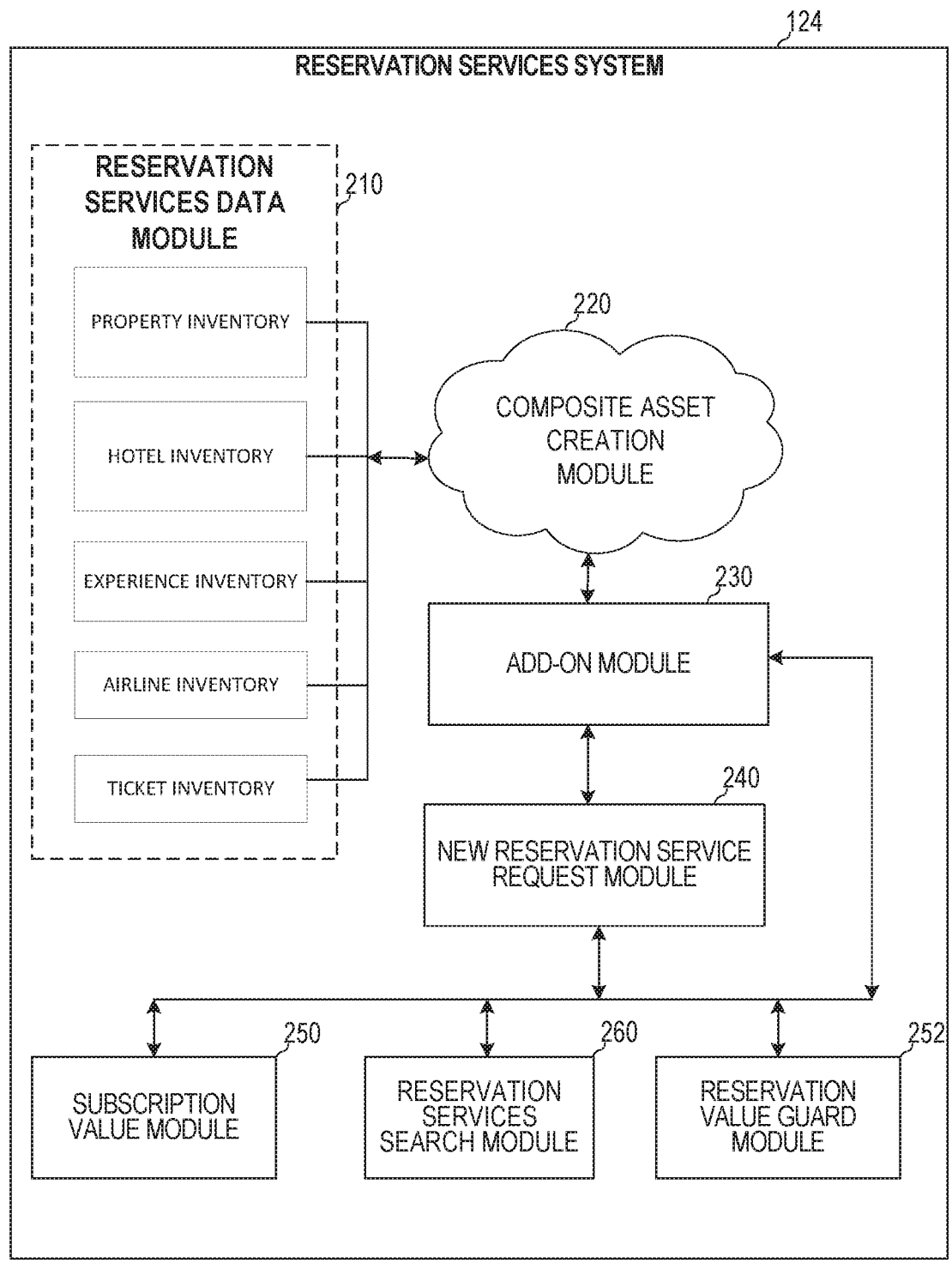
FIG. 2 illustrates a reservation services system, according to some example embodiments.

FIG. 2 illustrates a reservation services system 124, according to some example embodiments. The reservation services system 124 includes a reservation services data module 210, a composite asset creation module 220, an add-on module 230, a new reservation service request module 240, a subscription value module 250, a reservation services search module 260, and a reservation value guard module 252, In some implementations, some modules of the reservation services system 124 may be implemented on server system 108 and others may be implemented on third-party servers 130 and/or client device 110. In some implementations, all of the modules of the reservation services system 124 are implemented on server system 108, on third-party servers 130, or on client device 110. In such cases, server system 108 communicates information to third-party servers 130 based on the modules implemented and vice versa.

The new reservation service request module 240 may communicate with the client device 110 to receive reservation information including parameters and criteria for a new reservation service request from a user. For example, via the graphical user interface of the client device 110, the user can select a travel destination or geographical location and can, optionally, input the desired trip start date, end date, and/or trip length. The new reservation service request module 240 may communicate this user selection to the reservation services search module 260 to identify a list of available reservation services. In some cases, the new reservation service request module 240 may determine the type of primary reservation services that are included in the user's subscription and one or more add-on reservation services that are included in the user's subscription. The primary reservation services may form the basis for generating composite offerings to the subscriber. As an example, the primary reservation services may be hotels and the addon reservation services may be theater tickets or car rentals.

The new reservation service request module 240 may communicate an identifier of the user of the client device 110 to the subscription value module 250. In some embodiments, the parameters are automatically determined and computed on a nightly basis and used to curate a list of reservation services for a given user. In such cases, the user may enter a travel destination and the curated list is presented with previously selected travel dates (e.g., travel dates not inputted or selected by the user) (e.g., with travel dates having predetermined durations). In such cases, the new reservation service request module 240 may, on a periodic basis (e.g., nightly) retrieve subscription values for one or more users. The new reservation service request module 240 may also retrieve one or more travel destinations. The new reservation service request module 240 provides the subscription values and the travel destinations, as the selection to the reservation services search module 260. In this way, the reservation services search module 260 identifies available reservation services across a range of dates for one or more users and curates such a list for subsequent presentation to the user. The reservation services search module 260 may also generate composite offerings for one or more travel destinations without the user entering a specific travel destination. The user can simply enter a desired destination, and the available and curated list of reservation services at the destination, together with the available travel dates, are presented to the user. This is performed without having to communicate with each individual provider of the travel services to obtain cost information and availability when a user requests to view available travel services.

The reservation services search module 260 may communicate with the subscription value module 250 to obtain a subscription value for the user of the client device 110. The subscription value module 250 may communicate with the databases 128 to obtain the booking date and the computed subscription cost of the identified user along with a geographical location of the user. The booking date may be the current date indicating when the search module 260 conducts the search for available reservation services (e.g., the reservations services of the primary type) and/or the date on which the user requests to view available reservation services is received from the new reservation service request module 240. The subscription value module 250 may compute the subscription value based on various parameters: an aggregated subscription cost parameter, an amortized subscription cost parameter. For example, if monthly subscription of a user is $1,000, the aggregated subscription cost may be estimated to be $1,000, which is the number of months between the booking date and the travel date multiplied by the monthly subscription cost. The amortized subscription cost parameter may be computed based on a cost of the monthly subscription divided by the daily subscription cost. For example, the amortized subscription cost may be $2,000 divided by 60 days multiplied by the number of days between the booking date and the travel date. Assuming the number of days is 30, the estimated amortized subscription cost may be computed to be $999.90. In an example, the subscription value module 250 computes a subscription value as an average of the aggregated and the amortized subscription cost parameters.

The subscription value module 250 computes an estimate of the total amount the user will pay for the subscription by aggregating the total amount that they will pay (e.g., based on the user's monthly subscription cost) from the present time until 10 weeks from the present time. Namely, the subscription value module 250 assumes the user would have continued paying for the subscription until the travel start date from the booking date and estimates how much the user will end up paying for the subscription from the current booking date until the future travel start date. As an example, if the subscription costs $2500 per month, the subscription value module 250 may determine that the trip will start 10 weeks from the present day and, in the next 10 weeks, three months' worth of subscription fees (e.g., $7500) will be paid (assuming the fee is paid on the first day of every month). Accordingly, the subscription value module 250 may compute $7500 as the aggregated subscription cost parameter of the subscription value that will be paid from present time (the booking date) until the trip start time.

The subscription value module 250 may also compute as the subscription value an amortized amount of the subscription cost over an annual basis. For example, the subscription value module 250 may determine $30,000 as the total cost of the subscription for the entire year (e.g., by multiplying the number of months in a year, 12, by the monthly subscription fee, $2500). The subscription value module 250 may amortize the yearly subscription cost on a specified repeated period (e.g., daily, monthly, hourly, weekly) basis to determine the amount of the subscription fee that will be paid from the booking date until the travel start date. For example, if the trip is planned to start in 10 weeks, the subscription value module 250 computes $5,769 as the amortized subscription cost parameter of the subscription value, which is a total of 10 weeks' worth of the weekly subscription cost (e.g., annual subscription fee $30,000 divided by weeks per year and multiplied by 10 weeks).

The subscription value module 250 may compute the subscription value as a function of the aggregated subscription cost expected to be paid by the time the trip starts and the amortized subscription cost by the time the trip starts as measured from the booking date. For example, if the user plans the trip to start in 10 weeks from today (the booking date), the subscription value module 250 computes an average of $7,500 and $5,769. Then, the subscription value module 250 computes the subscription value by applying a first weight (e.g., multiplying) to the average. The value of the first weight may be based on the subscription type of the user making the reservation.

The subscription value module 250 provides the parameters of the subscription values to the reservation value guard module 252. The reservation value guard module 252 is configured to compute a guard range having a minimum travel value and a maximum purchase amount based on the subscription values. The guard range ensures that the reservation services identified by the reservation services search module 260 satisfy minimum parameters that ensure a subscriber receives a better deal or bargain than making the same reservation for the reservation service through another travel service system (e.g., a travel service system provided by the third-party servers 130). The guard range also ensures that the reservation services identified by the reservation services search module 260 satisfy a margin amount that provides a positive or negative level of profitability to the reservation services system 124. The margin amount may be computed based on a difference between the booking date and the travel date, such that the margin is greater when the difference is smaller than a threshold and is lower when the difference is greater than a threshold. Namely, the minimum travel value is used to ensure that travel service results provided to the user have a value, as determined by the first cost associated with the travel services, that is greater than the minimum travel value. Also, the maximum purchase amounts of each subscription value are used to ensure that the travel service results provided to the user are not valued, as determined by the second cost associated with the travel services, greater than the respective maximum purchase amount. In some cases, the first and second costs may be the same values and in other cases they are different values.

As an example, the reservation value guard module 252 computes the minimum reservation value as a function of the aggregated (or accumulated) subscription cost parameter of the subscription value. Specifically, the reservation value guard module 252 computes the minimum reservation value as 80 percent of the aggregated (or accumulated) subscription cost parameter. Accordingly, if the aggregated subscription cost is determined to be $7,500, the minimum reservation value is computed to be $6,000 (e.g., 80 percent of $7,500).

As an example, the reservation value guard module 252 computes the maximum purchase amounts for each of the first and second subscription values as a function of an adjusted average of the aggregated and amortized subscription cost parameters and the corresponding first and second weights. The average may be adjusted based on a margin amount or value that is associated with the user retrieved by the reservation value guard module 252 from the databases 128, Specifically, the reservation value guard module 252 computes a maximum purchase amount as an average of the aggregated (or accumulated) subscription cost parameter and the amortized subscription cost parameter offset by the retrieved margin.

The reservation services search module 260 receives the guard range from the reservation value guard module 252 and searches for reservation services of a primary type (e.g., hotels) that fall within the guard range and that satisfy the travel criteria (optionally) supplied by the user received from the new reservation service request module 240. As an example, the reservation services search module 260 first searches for all of the reservation services that are available on the travel date range (e.g., the travel start date and the travel duration) received from the client device 110 and/or received automatically by the reservation service request module 240. The reservation services search module 260 restricts or limits the search to those travel services that are within a specified range (e.g., 25 miles) of the travel destination or geographical region received from the client device 110 and/or received automatically by the reservation service request module 240. In some cases, the reservation services search module 260 accesses a predefined list of travel destinations and searches all of the available travel services available in 6-day periods (or other defined periods) during the course of the entire year. The reservation services search module 260 searches various combinations of travel dates and destinations to generate millions of combinations of possible travel destinations at various periods.

After the reservation services search module 260 identifies the list of reservation services of the primary type for the subscriber that are available on the travel start date and that meet the travel destination or geographical region parameters, the reservation services search module 260 obtains first and second costs associated with each of the reservation service of the primary type from the databases 128. The reservation services search module 260 compares the first or second costs of each of the identified travel services to the minimum travel value received from the reservation value guard module 252. In some embodiments, the reservation services search module 260 removes or filters from the list any travel service that has a first or second cost that is below the minimum reservation value. The reservation services search module 260 may also filter out and remove any travel destination that has a cancelation policy that fails to satisfy cancelation policy criteria.

In some embodiments, the reservation services search module 260 marks any reservation service having a first or second cost that is below the minimum reservation value as a candidate for generating a composite offering instead of removing the reservation service. After or before completing analyzing all of the reservation services in the list of reservation services, the reservation services search module 260 communicates with add-on module 230 to generate a composite offering for any marked reservation service. Specifically, the reservation services search module 260 may communicate with add-on module 230 to generate a composite offering that includes reservation services that have a first or second cost below the minimum reservation value and one or more other types of reservation services. In some implementations, the reservation services search module 260 provides to the add-on module 230 a first reservation service that has been marked as having a first or second cost that is below the minimum reservation value. For example, the first reservation service may be a hotel having a first cost of $2500 which is below the minimum reservation value of $4000. The add-on module 230 communicates with the new reservation service request module 240 to determine whether the subscription of the user allows for generating composite offerings. If so, the addon module 230 determines the type of add-on reservation services enabled for the user's subscription. For example, the user's subscription may include a rule that specifies that primary reservation service types (e.g., hotels) can be combined with one or more other reservation service types (e.g., car rentals and theater tickets) to generate a composite offering.

The add-on module 230 may compute a difference between the first cost of the first reservation service and the minimum reservation value. The add-on module 230 may then search the reservation services data module 210 for a plurality of reservation service types corresponding to the one or more other reservation service types included in the user's subscription to identify one or more reservation services having respective first costs that exceed to the computed difference. As an example, the add-on module 230 may compute the difference between the first cost of the first reservation service (e.g., $2500) and the minimum reservation value (e.g., $4000) to be $1500. The add-on module 230 may also determine that the rule for generating composite offerings specifies that car rentals and theater tickets can be combined with the primary type of reservation service. In such cases, the add-on module 230 may search car rentals and theater tickets available during the same reservation interval as the first reservation service to identify car rentals and theater tickets having respective first costs (e.g., $1590) that are more than a threshold (e.g., more than 5%) of the difference (e.g., $1500). The add-on module 230 may rank each of the identified one or more reservation services car rentals and theater tickets) by popularity, the amount by which the respective first cost exceeds the difference, and/or based on a user profile to select a candidate add-on reservation service.

In some cases, the add-on module 230 may determine that the first cost of a first of the identified reservation services exceeds the difference (e.g., $1500) by less than a first cost of a second of the identified reservation services. The add-on module 230 may further determine that the first of the identified reservation services matches more attributes of a user profile than the second identified reservation services. In such cases, the add-on module 230 selects the first of the identified reservation services for potentially combining with the first reservation service of the primary type to generate the composite asset because it has a better match with the user profile than the second of the identified reservation services.

The add-on module 230 may communicate with the reservation services data module 210 via the composite asset creation module 220 to retrieve the second cost of the candidate add-on reservation service. The add-on module 230 may add the second cost of the candidate add-on reservation service with the second cost of the first reservation service and compare the total cost of the potential composite offering with the maximum purchase amount received from reservation value guard module 252. If the total cost is less than the maximum purchase amount, the add-on module 230 combines the candidate add-on reservation service with the first reservation service to generate a composite offering. If the total cost is more than the maximum purchase amount, the add-on module 230 may select a second candidate add-on reservation service from the identified one or more reservation services. The add-on module 230 may retrieve the second cost of the second candidate add-on reservation service. The add-on module 230 may add the second cost of the second candidate add-on reservation service with the second cost of the first reservation service and compare the total cost of the second potential composite offering with the maximum purchase amount received from reservation value guard module 252. The add-on module 230 may return the composite offering to the reservation services search module 260 to present to the user among a list of available reservation services.

In some embodiments, the add-on module 230 may compute a difference between the total cost and the maximum purchase amount in response to determining that the total cost is less than the maximum purchase amount. If the difference between the total cost and maximum purchase amount is less than a threshold (e.g., the total cost of the two reservation services is less than the maximum purchase amount by less than 5%), the add-on module 230 may provide the composite offering that includes only the two types of reservation services (e.g., the primary type and the add-on reservation service type). If the difference between the total cost and maximum purchase amount is more than the threshold (e.g., the total cost of the two reservation services is less than the maximum purchase amount by more than 5%), the add-on module 230 may search the reservation services data module 210 for another add-on reservation service of a third type to be combined with the composite offering. In some cases, this third type of reservation service may be combined to generate the composite offering if the user's subscription allows more than two types of reservation services to be included in a given composite offering.

The add-on module 230 searches the reservation services data module 210 for a plurality of reservation service types corresponding to the third reservation service type included in the user's subscription to identify one or more reservation services having respective second costs that, when combined with the total cost of the first reservation service and the first add-on reservation service, does not exceed to the maximum purchase amount. As an example, the add-on module 230 may compute the difference between the total cost of the first reservation service and the first add-on reservation service and maximum purchase amount to be $500. This means that the second costs of the first reservation service and the first add-on reservation service combined together are still less than the maximum purchase amount by $500. The add-on module 230 may also determine that the rule for generating composite offerings specifies that, theater tickets can be combined with the primary type of reservation service (e.g., hotels) and the second type of reservation service of the first add-on reservation service (e.g., car rentals). In such cases, the add-on module 230 may search theater tickets available during the same reservation interval as the first reservation service and the first add-on reservation service to identify theater tickets having respective second costs (e.g., $430) that are less than the computed difference (e.g., $500) between the total cost of the first reservation service and the first add-on reservation service and maximum purchase amount. The add-on module 230 may rank each of the identified one or more reservation services (e.g., theater tickets) by popularity, the amount by which the respective second cost exceeds the difference, and/or based on a user profile to select a second candidate add-on reservation service. The add-on module 230 may then generate a composite offering that includes the first reservation service (e.g., of the primary type), the first add-on reservation service (e.g., of the second type), and the third add-on reservation service (e.g., of the third type).

In some embodiments, the reservation services search module 260 removes or filters from the list any reservation service that has a second cost that is above the maximum purchase amount received from the reservation value guard module 252. In some embodiments, to determine the first or second cost, the reservation services search module 260 may multiply a nightly first and/or second cost of each travel service during the travel period by the number of days in the travel service request. The reservation services system 124 presents the identified list of travel services to a subscriber.

In some cases, the reservation services search module 260 communicates with a trained machine learning technique module to obtain a classification for the user making the travel request and further filters or removes travel services based on the classification of the user. The reservation services search module 260 provides the filtered list of travel services back to the new reservation service request module 240 for provision to the client device 110 and presentation to the user for selection and requesting to make a reservation.

In some embodiments, the composite asset creation module 220 performs a matrix permutation of a plurality of reservation service types of the list of reservation services in the reservation services data module 210 to generate a plurality of composite offerings that correspond to the subscription value provided by the subscription value module 250. Each of the plurality of composite offerings includes two or more reservation services of different types that are associated with respective reservation values for which a combined reservation value corresponds to the subscription value. As an example, the composite asset creation module 220 randomly or pseudo randomly selects a set of reservation dates. The composite asset creation module 220 retrieves a subscription value for one or more users from the subscription value module 250. The composite asset creation module 220 communicates with the reservation services data module 210 to perform a matrix permutation of all or a subset of the reservation service types in the reservation services data module 210 for generating multiple composite offerings that correspond to the subscription value and that are available during the reservation dates.

For example, the composite asset creation module 220 selects a first reservation service type and retrieves the first cost of the first reservation service type. The composite asset creation module 220 compares the first cost to the minimum reservation value and if the first cost is less than the minimum reservation value, the composite asset creation module 220 creates a first column in the matrix for the first reservation service type. The composite asset creation module 220 then populates rows of the first column with each one of a plurality of other reservation service types available in the reservation services data module 210. Each other reservation service type is added to the row in the first column if it has a respective first cost that combined with the first cost of the first reservation service type is greater than the minimum reservation value. The composite asset creation module 220 then selects a second reservation service type that has a first cost that is below the minimum reservation value. The composite asset creation module 220 adds the second reservation service type to a second column of the matrix and similarly populates rows of the column with other reservation service types.

The composite asset creation module 220 may rank and sort the rows and columns of the matrix based on a user profile to display one or more composite offerings to a given user that match the user's interests. In this way, without the user specifying a travel date, the user can browse a graphical user interface of the reservation services system 124 and be presented with a list of possible composite offerings available at the randomly or pseudo randomly selected set of reservation dates. If the user finds a given composite offering of interest, the user can select the composite offering to automatically create a reservation for the multiple reservation service types included in the selected offering without having to navigate through a complex and time-consuming checkout process.

In some cases, the add-on module 230 communicates with the composite asset creation module 220 to obtain the pre-generate matrix of the composite offerings. Using the pre-generated matrix, the add-on module 230 can quickly determine a composite offering available for a marked reservation service identified by the reservation services search module 260. In such cases, the add-on module 230 need not perform the difference computation and search for an add-on reservation service. Namely, the add-on module 230 receives a marked reservation service, searches for the reservation service in the previously generated matrix (e.g., the columns of the matrix) and then selects one or more candidate add-on reservation services from the rows of the column of the marked reservation service.

Figure 3A:
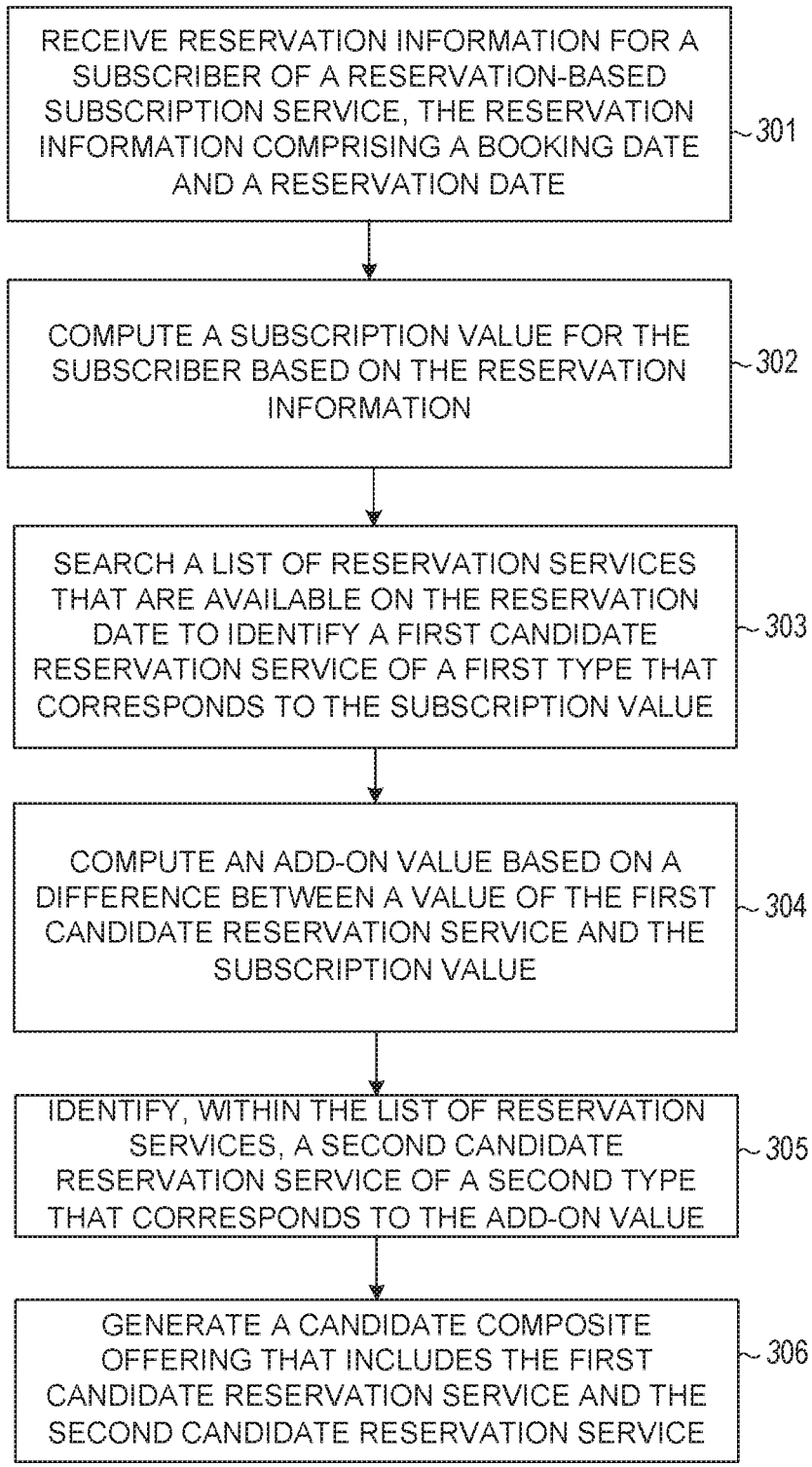
FIGS. 3-4 illustrate flow diagrams of processes of the reservation services system, according to some example embodiments.
Figure 3B:
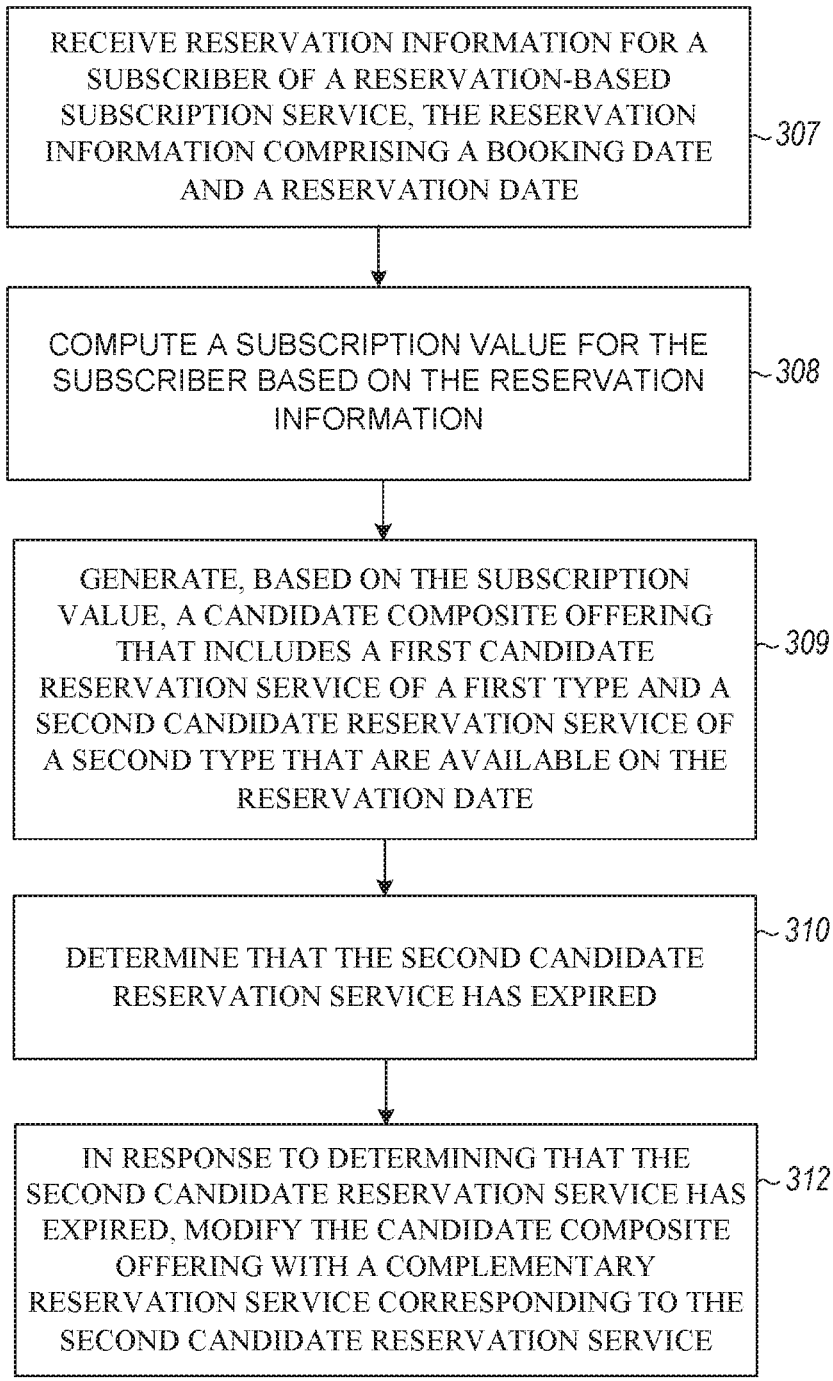
Figure 4:
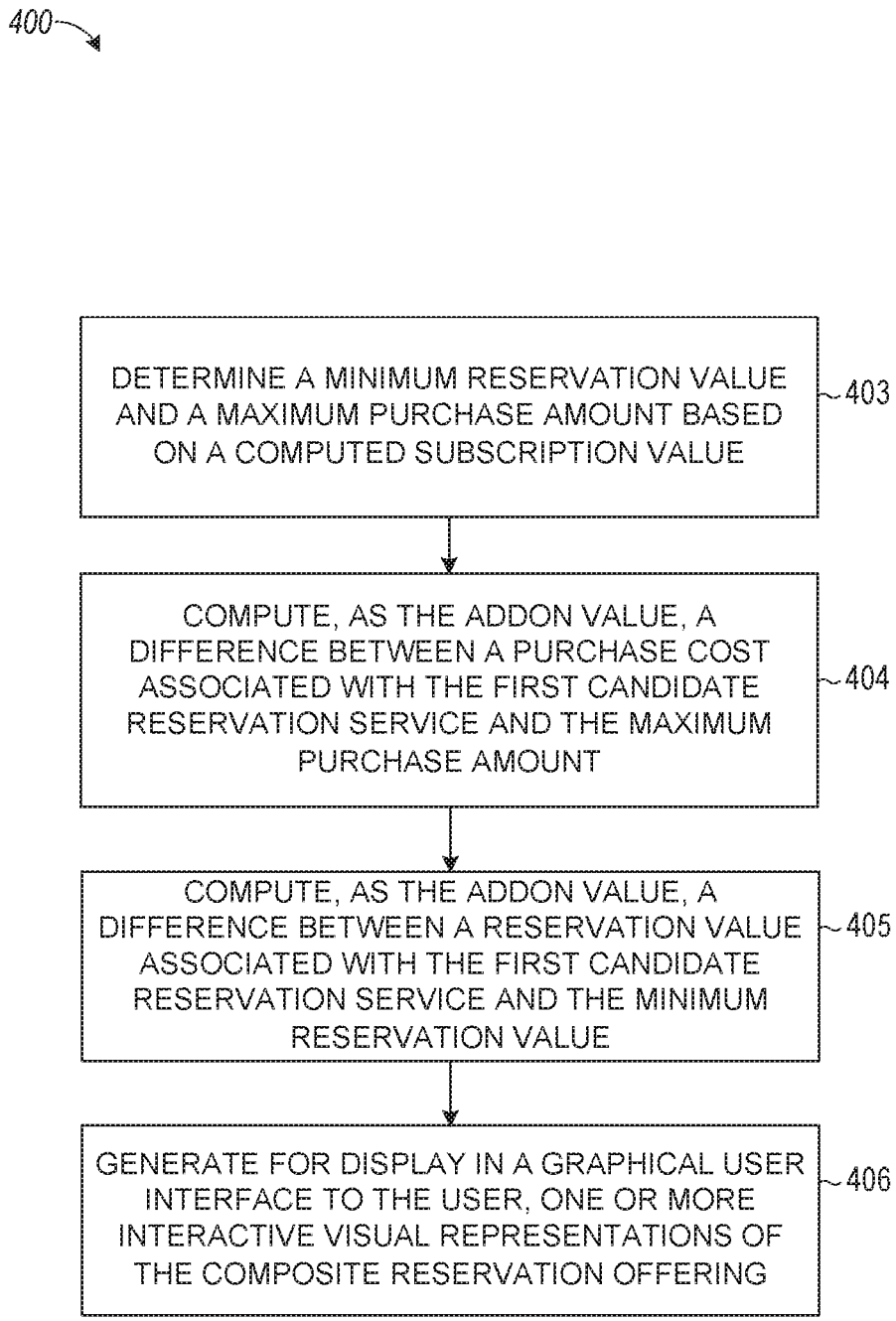

FIGS. 3A, 3B and 4 illustrate flow diagrams of processes of the reservation services system 124, according to some example embodiments. The processes 300, 400 may be embodied in computer-readable instructions for execution by one or more processors such that the operations of the processes 300, 400 may be performed in part or in whole by the functional components of the server system 108; accordingly, the processes 300, 400 are described below by way of example with reference thereto. However, in other embodiments at least some of the operations of the processes 300, 400 may be deployed on various other hardware configurations. The processes 300, 400 are therefore not intended to be limited to the server system 108 and can be implemented in whole, or in part, by any other component. Any operation in the processes 300, 400 can be performed in any order or entirely omitted and skipped.

At operation 301, a computing system (e.g., server system 108) receives reservation information for a subscriber of a reservation-based subscription service. The reservation information comprising a booking date and a reservation date.

At operation 302, the computing system computes a subscription value for the subscriber based on the reservation information.

At operation 303, the computing system searches a list of reservation services that are available on the reservation date to identify a first candidate reservation service of a first type that corresponds to the subscription value.

At operation 304, the computing system computes an add-on value based on a difference between a value of the first candidate reservation service and the subscription value.

At operation 305, the computing system identifies, within the list of reservation services, a second candidate reservation service of a second type that corresponds to the add-on value.

At operation 306, the computing system generates a candidate composite offering that includes the first candidate reservation service and the second candidate reservation service.

At operation 307, the computing system receives reservation information for a subscriber of a reservation-based subscription service, the reservation information comprising a booking date and a reservation date.

At operation 308, the computing system computes a subscription value for the subscriber based on the reservation information.

At operation 309, the computing system generates, based on the subscription value, a candidate composite offering that includes a first candidate reservation service of a first type and a second candidate reservation service of a second type that are available on the reservation date.

At operation 310, the computing system determines that the second candidate reservation service has expired.

At operation 312, the computing system in response to determining that the second candidate reservation service has expired, modifies the candidate composite offering with a complementary reservation service corresponding to the second candidate reservation service.

At operation 403, the computing system determines a minimum reservation value and a maximum purchase amount based on a computed subscription value.

At operation 404, the computing system computes, as the add-on value, a difference between a purchase cost associated with the first candidate reservation service and the maximum purchase amount.

At operation 405, the computing system computes, as the add-on value, a difference between a reservation value associated with the first candidate reservation service and the minimum reservation value.

At operation 406, the computing system generates for display in a graphical user interface to the user, one or more interactive visual representations of the composite reservation offering.

In some embodiments, the server system 108 stores for each candidate reservation service of the candidate composite offering an indication of availability. Specifically, the candidate composite offering may be an option to reserve the reservation services included in the candidate composite offering. If the candidate composite offering is not reserved by a subscriber, the option expires. If the candidate composite offering is reserved by the subscriber, the option is executed and the reservation services in the candidate composite offering are consumed.

In some cases, a first subscriber may be presented with a candidate composite offering that includes a reservation service that is also being presented to another subscriber. As an example, the first subscriber may be presented with an option to reserve a first candidate composite offering that includes a hotel reservation and tickets for seats to a show. A second subscriber may be presented with an option to reserve a second candidate composite offering that includes a flight and tickets for the same seats to the same show as the first candidate composite offering. A third subscriber may be presented with an option to reserve just the tickets for the same seats to the same show as the first and second candidate composite offerings. The first, second and third subscribers may thus be simultaneously, on different devices, be viewing options to reserve the same given reservation service (e.g., tickets for a set of seats to a given show). If any one of the subscribers selects the option to reserve the given reservation service, the other subscribers may no longer be able to reserve the given reservation service as an individual reservation service or as part of a composite offering. In such cases, the server system 108 may determine that the given reservation service has expired.

In response to determining that the given reservation service has expired, the server system 108 may replace the given reservation service with a complementary reservation service. Specifically, the server system 108 may query the database for the indication of availability of each reservation service included in a given composite offering when a user requests to reserve the composite offering. In response to receiving data from the database indicating that each reservation service in the composite offering is still available, the server system 108 may, determine that the composite offering is not expired or that none of the reservation services in the composite offering are expired. The server system 108 may receive a user selection or request to reserve the composite offering. In response, the server system 108 may reserve the reservation services included in the composite offering and update the indication of availability of each reservation service that is stored in the database. In some cases, the indication of availability that is stored is updated to indicate that the reservation service is now expired and not available to be reserved by any other user. In some cases, the indication of availability that is stored is updated by decrementing an availability count. When the server system 108 determines that the availability count has reached a specified threshold or amount, the server system 108 determines that the corresponding reservation service has become expired.

In response to determining that the given reservation service included in the composite offering is associated with data indicating that the given reservation service is no longer available, the server system 108 may search for a complementary reservation service. For example, the server system 108 may, replace the option presented to the first subscriber for reserving the first candidate composite offering that includes a hotel reservation and tickets for seats to a show with an option to reserve a modified first candidate composite offering. The modified first composite offering may include the same hotel reservation as the first candidate composite offering but may include tickets for different seats to the same show as the first composite offering. As an example, the tickets for the seats to the show of the first candidate composite offering may include a first pair of seats in a first tier or category. In such cases, the server system 108 may search for a new pair of seats in the same first tier or category as the first pair of seats that are available to replace the tickets to the show in the first candidate composite offering. If such seats are found, the server system 108 may generate the modified first candidate composite offering with the new pair of seats. The server system 108 may notify the first subscriber about the change, such as by presenting a visual indicator in the graphical user interface in association with the option to reserve the first candidate composite offering.

In certain cases, the server system 108 may be unable to find complementary reservation services corresponding to a reservation service that has expired. In such cases, the server system 108 may make the option to reserve the expired reservation service (or the option to reserve the candidate composite offering that includes the expired reservation service) unavailable for selection in the graphical user interface. The server system 108 may notify the user about the unavailability of the complementary reservation service and may suggest a different type of reservation service. For example, the server system 108 may determine that the tickets to the show included in the first candidate composite offering have expired (e.g., another user has reserved the same tickets). The server system 108 may also determine that another set of tickets are not available to the same show in the same seat category as the expired tickets. In such cases, the server system 108 may search for other tickets in a higher or lower seat category to replace the tickets in the first candidate composite offering. Alternatively, the server system 108 may search for a different add-on reservation service to combine with the unexpired reservation service included in the first candidate composite offering. Namely, the server system 108 may find a dinner reservation with a similar cost/value as the tickets to the show that are expired. In response, the server system 108 may replace the tickets to the show in the first candidate composite offering with the dinner reservation. The server system 108 may generate the modified first candidate composite offering that includes the hotel reservation and the dinner reservation instead of the tickets to the show. The server system 108 may present an option to the first subscriber to reserve the modified first candidate composite offering instead of the first candidate composite offering that includes the expired reservation service.

In some embodiments, the server system 108 may be unable to find complementary reservation services corresponding to a reservation service that has expired. In such cases, the server system 108 may select another candidate composite offering from a previously computed matrix of composite offerings to replace the candidate composite offering that includes the expired reservation service. Namely, the server system 108 may select another composite offering that is ranked just below the candidate composite offering that includes the expired reservation service to present to the subscriber in place of the candidate composite offering that includes the expired reservation service.

In some embodiments, in response to determining that a candidate reservation service in a candidate composite offering is expired, the server system 108 may search for a complementary reservation service based on an add-on value used to find the expired candidate reservation service. Specifically, the candidate composite offering may include a first candidate reservation service of a first type and a second candidate reservation service of a second type. The server system 108 may determine that the second candidate reservation service of the second type has expired. In response, the server system 108 may identify a third reservation service of the second type (the same type as the reservation service that has expired) that has a cost available to non-subscribers that is also less than the minimum value in the value guard. The server system 108 may add the cost of the third reservation service of the second type with the first cost of the first reservation service of the first type. The server system 108 may compare the combined costs of the first reservation service and the third reservation service and determine that the combined cost is greater than the minimum value. The server system 108 may then retrieve the second cost of the first reservation service (e.g., the intrinsic value) and combine the second cost of the second reservation service with the intrinsic value (e.g., the second cost of the second reservation service). The server system 108 may determine whether the combined second costs (e.g., the total intrinsic value of the two reservation services) is less than the maximum purchase amount of the value guard. If so, the server system 108 may modify the composite offering to include the first reservation service with the third reservation service.

If the server system 108 determines that the combined costs of the first and third reservation services is not greater than the minimum value and/or if the server system 108 determines that the combined seconds costs exceed the maximum purchase amount, the server system 108 may search for another possible reservation service of the second type. If no other reservation service of the second type can be combined with the first reservation service to meet the value guard (e.g., the minimum value and the maximum purchase amount), the server system 108 searches for a reservation service of a third type to be combined with the first reservation service to modify the composite offering. The server system 108 verifies that the reservation service of the third type can be combined with the first reservation service to meet the value guard and, if so, the server system 108 replaces the composite offering that included the expired reservation service of the second type with the reservation service of the third type.

Figure 5:
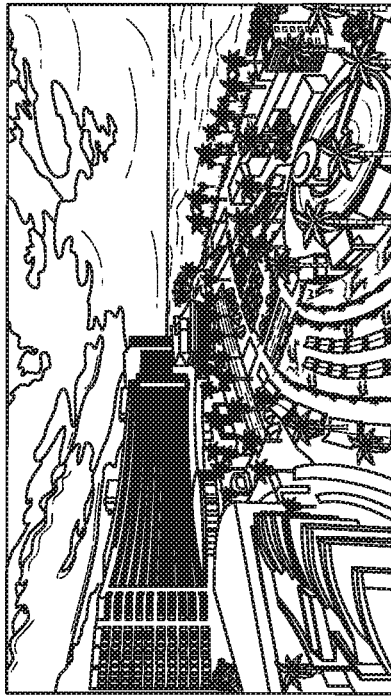
FIG. 5 is an illustrative graphical user interface of e reservation services system, according to some example embodiments.

FIG. 5 is an illustrative graphical user interface of the reservation services system 124, according to some example embodiments. As shown in FIG. 5, a user Julie may access the reservation services system 124. As shown in FIG. 5, after the user Julie activates the subscription, the user (Julie) can input reservation search criteria 501. This reservation search criteria 501 may include various parameters 502 including a travel destination, distance to the destination, start date of the travel, end date of the travel, number of days in the trip, quality of the travel services, reservation service types, whether or not to include composite offerings, and/or any combination thereof. The reservation services system 124 processes the reservation search criteria and automatically generates a list of matching reservation services for presentation using one or more interactive visual representations 503. In some cases, the reservation services system 124 processes the reservation search criteria and automatically selects one of a plurality of previously generated and curated lists of travel services for presentation using one or more interactive visual representations 503. A user can select any one of the interactive visual representations 503 to instruct the reservation services system 124 to complete and book a reservation for the corresponding reservation service (e.g., book a hotel room) associated with the selected visual representation.

In some embodiments, the travel services in the graphical user interface of FIG. 5 are generated using individualized reservation service lists for the user based on travel behaviors, geographical location, demographics, or a margin target for the user. For example, the reservation services system 124 may further filter or reorganize the list of available reservation services presented to the first user in FIG. 5 based on a profile of the first user that indicates various attributes of the user (e.g., travel behaviors, geographical location, demographics, a subscription type, cancelation frequency, number of reservations made in a given time interval, or a margin target specific to the user or classification of the user).

As an example, after receiving the search criteria from the first user (Julie), the reservation services system 124 may obtain a list of reservation services that are available and that match the search criteria. The reservation services system 124 generates a subscription value for the first user (Julie). The reservation services system 124 compares a cost of each reservation service with the subscription value. Based on this comparison, the reservation services system 124 generates a filtered or curated list of travel services and presents the list to the user in FIG. 5. In some embodiments, the reservation services system 124 includes a composite offering 522 among the interactive visual representations 503. The composite offering may include multiple types of reservation services that are automatically booked or reserved when the user selects the interactive visual representation for the composite offering 522. As an example, composite offering 522 includes a hotel and a dinner reservation at a restaurant during the specified reservation or travel period. In response to receiving a user selection of the interactive visual representation of the composite offering 522, the reservation services system 124 automatically reserves the hotel and the dinner reservation for the user. In some cases, the interactive visual representations 503 only include composite offerings. In some cases, the interactive visual representations 503 include options for reserving one or more composite offerings (hotels and dinner reservations and/or hotels and theater tickets) and reservations of a single reservation type (e.g., only hotels).

In some cases, the reservation services system 124 receives a user request to reserve a composite offering 522. The reservation services system 124 may determine that the selected composite reservation service has expired (e.g., because another user has already reserved one of the reservation services included in the composite offering). In response, the server system 108 may replace the given reservation service with a complementary reservation service and generate a notification 512 indicating to the user that the selected composite offering is no longer available. The notification 512 may identify the complementary reservation service that has been combined with the primary reservation service to create a new composite offering. The notification 512 may ask the user to confirm whether the user would like to continue with making the reservation for the new composite offering. In response to receiving a user selection of a YES option (not shown), the reservation services system 124 automatically reserves the new composite offering for the user instead of the selected composite offering 522.

Figure 6:
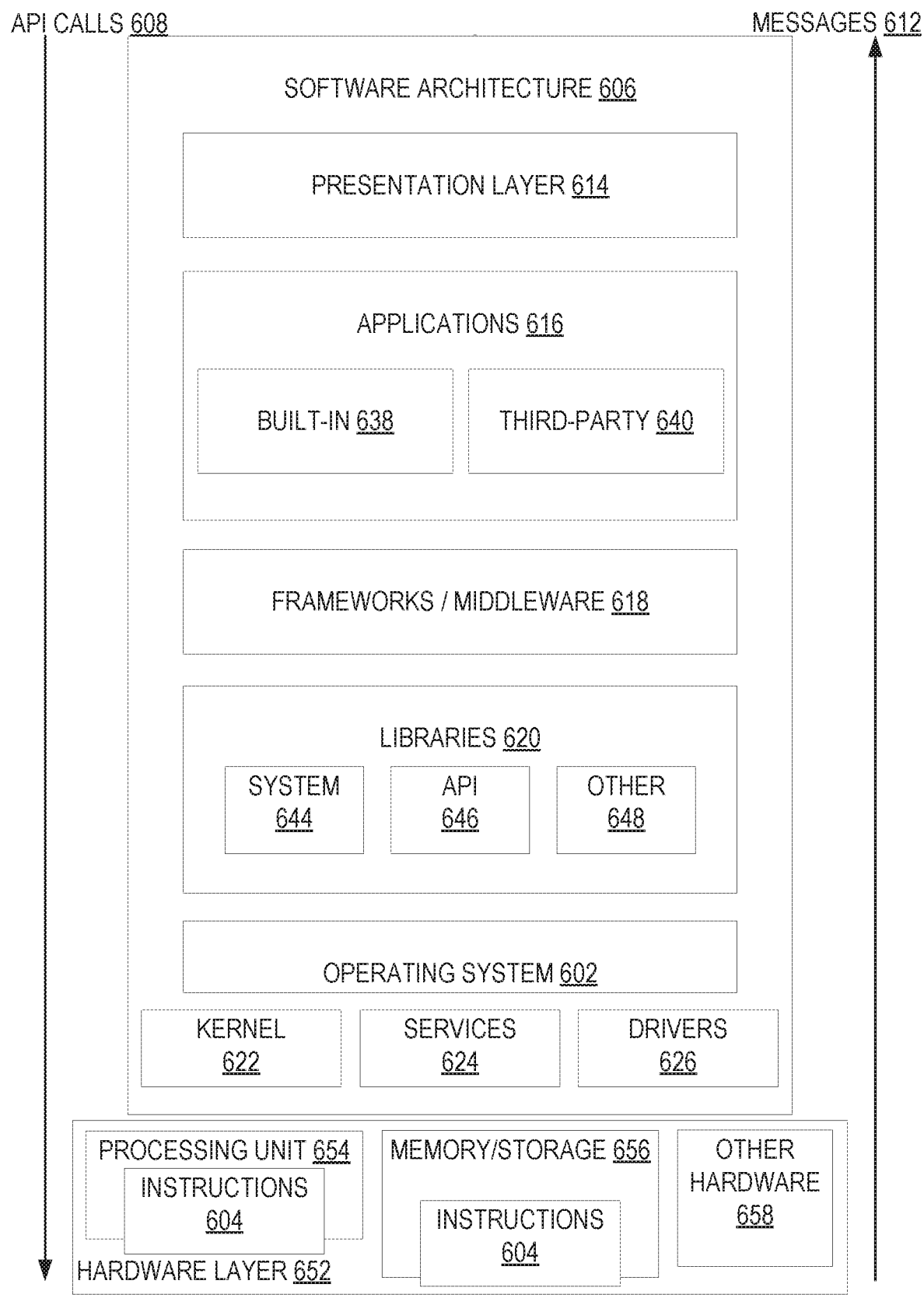
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware (including a hardware layer 652 with processing unit 654, memory/storage 656, and other hardware 658) such as machine 700 of FIG. 7 that includes processors 704, memory/storage 706, and input/output (I/O) components 718. As explained below, the processing unit 654 is configured to execute instructions 604 that are stored in memory/storage 656. In this example, the software architecture 606 can be conceptualized as a stack of layers where each layer may provide a particular functionality. For example, the software architecture 606 includes layers such as an operating system 602, libraries 620, frameworks 618, and applications 616. Operationally, the applications 616 invoke API calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include built-in applications 638 including any one or more of a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 608 provided by the operating system 602 to facilitate functionality described herein.

Some embodiments may particularly include a subscription-based travel services application. In certain embodiments, this may be a stand-alone application that operates to manage communications with a server system such as third-party servers 130 or server system 108. In other embodiments, this functionality may be integrated with another application. The subscription-based travel services application may request and display various data related to subscription-based travel services and may provide the capability for a user to input data related to the objects via a touch interface, keyboard, or using a camera device of machine 700, communication with a server system, and receipt and storage of object data in a memory/storage device. Presentation of information and user inputs associated with the information may be managed by subscription-based travel services application using different frameworks 618, library 620 elements, or operating system 602 elements operating on a machine 700.

Figure 7:
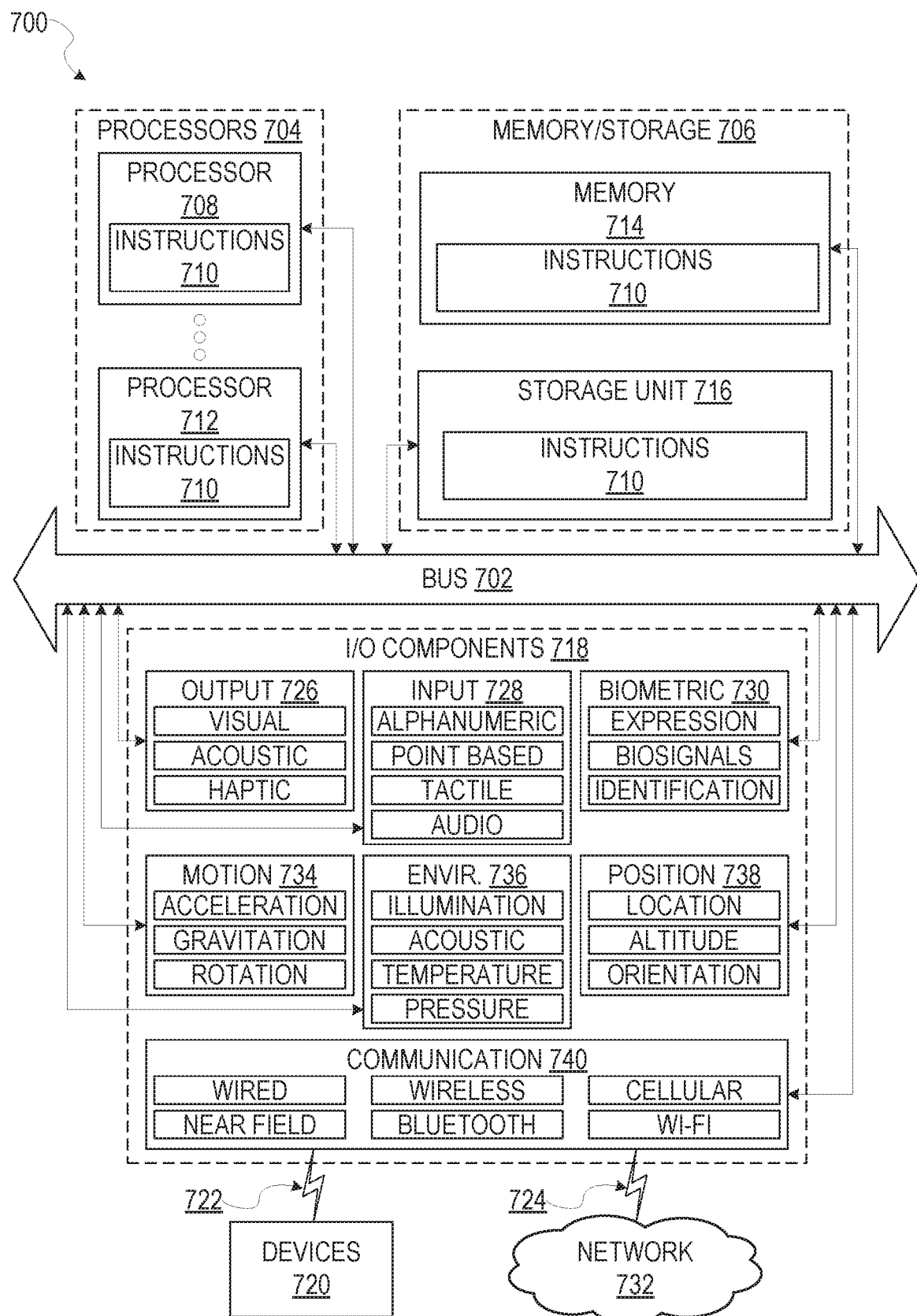
FIG. 7 illustrates a diagrammatic representation of a machine, in e form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 108, 120, 122, 124, and the like, as a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various embodiments, the machine 700 comprises processors 704, memory 714, and I/O components 718, which can be configured to communicate with each other via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 704 (also referred to as "cores") that can execute instructions 710 contemporaneously. Although FIG. 7 shows multiple processors 704, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some embodiments. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various embodiments, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the I/O components 718 can include many other components that are not shown in FIG. 7. The I/O components 718 are grouped according to functionality merely for simplifying the following discussion, and the grouping is in no way limiting. In various example embodiments, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a US B).

Moreover, in some embodiments, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data. Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 732 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 710 are transmitted or received over the network 732 using a transmission medium via a network interface device, a network interface component included in the communication components 740) and utilizing any one of a number of well-known transfer protocols (e.g., Hypertext Transfer Protocol (HTTP)). Similarly, in other example embodiments, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component, Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   generating a pre-aggregation of composite offerings for a subscriber of one or more subscribers of a reservation-based subscription service, the generating of the pre-aggregation including pre-generating a matrix, the matrix including permutations of types of the composite offerings, and ranking the composite offerings in the pre-generated matrix based on a user profile of the subscriber;
   training, by the one or more processors, a machine-learning module using classifications associated with reservation activities of the one or more subscribers;
   receiving, by the one or more processors, reservation information for the subscriber, the reservation information comprising a booking date and a reservation date;
   computing, by the one or more processors, a subscription value for the subscriber based on the reservation information, the subscription value based on subscription cost paid by the subscriber to subscribe to the reservation-based subscription service;
   obtaining a classification of the subscriber based on an application of the machine-learning module to reservation activities of the subscriber;
   generating, based on the subscription value, a candidate composite offering that includes a first candidate reservation service of a first type and a second candidate reservation service of a second type that are available on the reservation date, the generating of the candidate composite offering including filtering the pre-aggregation of composite offerings based on the classification;
   determining that the second candidate reservation service has expired based on an action of an additional subscriber of the one or more subscribers that occurs before a selection of the candidate composite offering by the subscriber; and
   in response to the determining that the second candidate reservation service has expired, selecting a modification of the candidate composite offering, the selecting of the modification of the candidate composite offering including replacing the expired second candidate reservation service with a complementary reservation service, the modification of the candidate composite offering being ranked below the candidate composite offering in the pre-aggregation.

2. The computer-implemented method of claim 1, wherein generating the candidate composite offering comprises:
   searching a list of reservation services that are available on the reservation date to identify the first candidate reservation service that corresponds to the subscription value;
   computing an add-on value based on a difference between a value of the first candidate reservation service and the subscription value; and
   identifying, within the list of reservation services, the second candidate reservation service that corresponds to the add-on value.

3. The computer-implemented method of claim 1, wherein the first candidate reservation service of the first type includes a hotel stay, and wherein the second candidate reservation service of the second type includes a rental car, airfare, home/residence, experiential travel, guided tour, cruise, train fare, private aviation, bespoke travel, event-based travel, or space travel.

4. The computer-implemented method of claim 1, further comprising: determining, for the first candidate reservation service, a first value guard comprising a minimum reservation value and a maximum purchase amount based on the computed subscription value.

5. The computer-implemented method of claim 4, wherein:
   the booking date is a current date; and the subscription value is computed based on a time interval between the booking date and the reservation date and a portion of the subscription cost to be paid by the subscriber during the time interval.

6. The computer-implemented method of claim 4, wherein the value of the first candidate reservation service is between the first value guard, further comprising computing an add-on value by:
retrieving a reservation value associated with the first candidate reservation service; and
computing, as the add-on value, a difference between the reservation value associated with the first candidate reservation service and the minimum reservation value.

7. The computer-implemented method of claim 1, wherein determining that the second candidate reservation service has expired comprises determining that a second subscriber of the reservation-based subscription service has reserved or consumed the second candidate reservation service before the subscriber requests to reserve the candidate composite offering.

8. The computer-implemented method of claim 7, wherein the second subscriber selects an identifier corresponding to another composite offering that includes the second candidate reservation service to reserve the second candidate reservation service.

9. The computer-implemented method of claim 1, wherein modifying the candidate composite offering comprises replacing the second candidate reservation service with the complementary reservation service.

10. The computer-implemented method of claim 1, further comprising generating a visual notification to the subscriber indicating that the candidate composite offering has been modified.

11. The computer-implemented method of claim 1, further comprising:
searching a list of reservation services that are available on the reservation date to identify the complementary reservation service, the searching comprising identifying a subset of reservation services in the list that have a value corresponding to a value of the second candidate reservation service and that correspond to the second type; and
selecting, as the complementary reservation service, one of the reservation services in the subset.

12. The computer-implemented method of claim 1, wherein the second candidate reservation service comprises a first seat of a given category at an event, and wherein the complementary reservation service comprises a second seat at the event in a same given category as the first seat.

13. The computer-implemented method of claim 1, further comprising:
reserving the candidate composite offering for the subscriber; and
preventing the subscriber from reserving additional reservation services until the reserved candidate composite offering expires or is consumed by the subscriber.

14. The computer-implemented method of claim 1, further comprising:
receiving input from the subscriber that selects the second type of reservation service from a plurality of reservation service types, wherein the generating is based on the received input.

15. The computer-implemented method of claim 1, further comprising generating a list of different types of subscription models for the subscriber to select as the subscription, a first type of the subscription models allows the subscriber to reserve travel services within a specific region, a second type of the subscription models allows the subscriber to reserve travel services with a specific reservation duration, and a third type of the subscription models allows the subscriber to reserve travel services of a plurality of types.

16. The computer-implemented method of claim 1, further comprising:
identifying a third candidate reservation service of the first type that has a greater value than the first candidate reservation service and corresponds to the subscription value; and
presenting, in a graphical user interface, a first option to reserve the candidate composite offering and a second option to reserve the third candidate reservation service, the first and second options being presented concurrently.

17. The computer-implemented method of claim 16, further comprising:
receiving a selection of the first option to reserve the candidate composite offering;
verifying that the second candidate reservation service is still available in response to receiving the selection; and
modifying the candidate composite offering with the complementary reservation service in response to determining that the verifying.

18. The computer-implemented method of claim 1, further comprising:
determining that the complementary reservation service corresponding to the second candidate reservation service is unavailable; and
in response to determining that the complementary reservation service corresponding to the second candidate reservation service is unavailable, identifying a third candidate reservation service of a third type; and
modifying the candidate composite offering with the identified third candidate reservation service of the third type.

19. A system comprising:
one or more memories;
one or more processors;
a set of instructions stored in the one or more memories, the set of instructions configuring the one or more processors to perform operations, the operations comprising:
generating a pre-aggregation of composite offerings for a subscriber of one or more subscribers of a reservation-based subscription service, the generating of the pre-aggregation including pre-generating a matrix, the matrix including permutations of types of the composite offerings, and ranking the composite offerings in the pre-generated matrix based on a user profile of the subscriber;
training a machine-learning module using classifications associated with reservation activities of the one or more subscribers;
receiving reservation information for the subscriber, the reservation information comprising a booking date and a reservation date;
obtaining a classification of the subscriber based on an application of the machine-learning module to reservation activities of the subscriber;
computing a subscription value for the subscriber based on the reservation information, the subscription value based on subscription cost paid by the subscriber to subscribe to the reservation-based subscription service;
generating, based on the subscription value, a candidate composite offering that includes a first candidate reservation service of a first type and a second candidate reservation service of a second type that are available on the reservation date, the generating of the candidate composite offering including filtering the pre-aggregation of composite offerings based on the classification;

determining that the second candidate reservation service has expired based on an action of an additional subscriber of the one or more subscribers that occurs before a selection of the candidate composite offering by the subscriber; and in response to the determining that the second candidate reservation service has expired, selecting a modification of the candidate composite offering, the selecting of the modification of the candidate composite offering including replacing the expired second candidate reservation service with a complementary reservation service, the modification of the candidate composite offering being ranked below the candidate composite offering in the pre-aggregation.

20. A non-transitory computer-readable medium comprising instructions stored thereon that are executable by at least one processor to cause a computing device to perform operations comprising:

generating a pre-aggregation of composite offerings for a subscriber of one or more subscribers of a reservation-based subscription service, the generating of the pre-aggregation including pre-generating a matrix, the matrix including permutations of types of the composite offerings, and ranking the composite offerings in the pre-generated matrix based on a user profile of the subscriber;

training a machine-learning module using classifications associated with reservation activities of the one or more subscribers;

receiving reservation information for the subscriber, the reservation information comprising a booking date and a reservation date;

obtaining a classification of the subscriber based on an application of the machine-learning module to reservation activities of the subscriber;

computing a subscription value for the subscriber based on the reservation information, the subscription value based on subscription cost paid by the subscriber to subscribe to the reservation-based subscription service;

generating, based on the subscription value, a candidate composite offering that includes a first candidate reservation service of a first type and a second candidate reservation service of a second type that are available on the reservation date, the generating of the candidate composite offering including filtering the pre-aggregation of composite offerings based on the classification;

determining that the second candidate reservation service has expired based on an action of an additional subscriber of the one or more subscribers that occurs before a selection of the candidate composite offering by the subscriber; and in response to the determining that the second candidate reservation service has expired, selecting a modification of the candidate composite offering, the selecting of the modification of the candidate composite offering including replacing the expired second candidate reservation service with a complementary reservation service, the modification of the candidate composite offering being ranked below the candidate composite offering in the pre-aggregation.

* * * * *